(12) United States Patent
Habermehl et al.

(10) Patent No.: US 12,270,769 B2
(45) Date of Patent: Apr. 8, 2025

(54) METHOD FOR DETERMINING A COATING PROPERTY

(71) Applicant: Endress+Hauser Flowtec AG, Reinach (CH)

(72) Inventors: Anne Habermehl, Erding (DE); Stefan Pflüger, Munich (DE); Wolfgang Drahm, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 90 days.

(21) Appl. No.: 18/257,696

(22) PCT Filed: Nov. 26, 2021

(86) PCT No.: PCT/EP2021/083214
§ 371 (c)(1),
(2) Date: Jun. 15, 2023

(87) PCT Pub. No.: WO2022/128417
PCT Pub. Date: Jun. 23, 2022

(65) Prior Publication Data
US 2024/0077433 A1   Mar. 7, 2024

(30) Foreign Application Priority Data
Dec. 16, 2020  (DE) .................. 10 2020 133 858.9

(51) Int. Cl.
*G01N 22/00* (2006.01)
*G01F 1/58* (2006.01)
*G01F 1/74* (2006.01)

(52) U.S. Cl.
CPC ............... *G01N 22/00* (2013.01); *G01F 1/74* (2013.01); *G01F 1/58* (2013.01)

(58) Field of Classification Search
CPC .............. G01N 22/00; G01F 1/58; G01F 1/74
(Continued)

(56) References Cited

U.S. PATENT DOCUMENTS 5,216,372 A   6/1993  Zoughi et al.
6,198,293 B1  3/2001  Woskov et al.
(Continued)

FOREIGN PATENT DOCUMENTS

GB         2479741 A      10/2011
WO     2018121927 A1       7/2018

*Primary Examiner* — Raul J Rios Russo
(74) *Attorney, Agent, or Firm* — Mark A. Logan; Endress+Hauser (USA) Holding, Inc.

(57) ABSTRACT

A method for determining a deposit property of a variable deposit on an end face of a first microwave antenna of an assembly for determining a property of a multiphase medium that is to be conveyed, wherein the first microwave antenna is arranged in a first receptacle of the measuring pipe in a medium-contacting manner, wherein the method comprises emitting an excitation signal by means of the first microwave antenna, wherein the excitation signal comprises a sequence of high-frequency signals; receiving a reflected excitation signal by means of the first microwave antenna; determining a first test quantity on the basis of the reflected excitation signal; and determining on the basis of the first test quantity the deposit property of the variable deposit, in particular a variable dependent on a deposit thickness of the variable deposit.

8 Claims, 6 Drawing Sheets

(58) Field of Classification Search
USPC .......................................................... 324/642
See application file for complete search history.

(56) References Cited

U.S. PATENT DOCUMENTS

| | | | |
|---|---|---|---|
| 8,027,794 B2 | 9/2011 | Xie | |
| 9,063,052 B2 | 6/2015 | Folgeroe et al. | |
| 2010/0011877 A1* | 1/2010 | Izumi ...................... | G01F 1/586 |
| | | | 73/861.12 |
| 2012/0092006 A1* | 4/2012 | Li ........................ | G01R 33/563 |
| | | | 324/306 |
| 2012/0096950 A1* | 4/2012 | Wada .................... | G01F 1/8436 |
| | | | 73/861.356 |
| 2016/0054161 A1 | 2/2016 | Abou Khousa et al. | |
| 2017/0160069 A1 | 6/2017 | Folgero et al. | |
| 2023/0168114 A1* | 6/2023 | Tschudin .............. | G01F 23/268 |
| | | | 73/861.12 |
| 2023/0204401 A1* | 6/2023 | Tschudin ................ | G01F 1/588 |
| | | | 73/861.12 |
| 2023/0221157 A1* | 7/2023 | Bitto ..................... | G01F 1/8477 |
| | | | 73/861.355 |

* cited by examiner

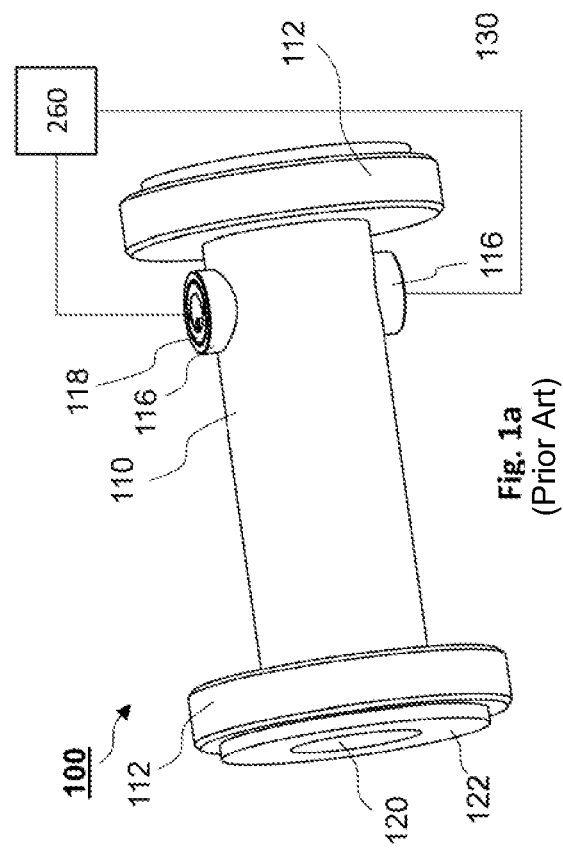
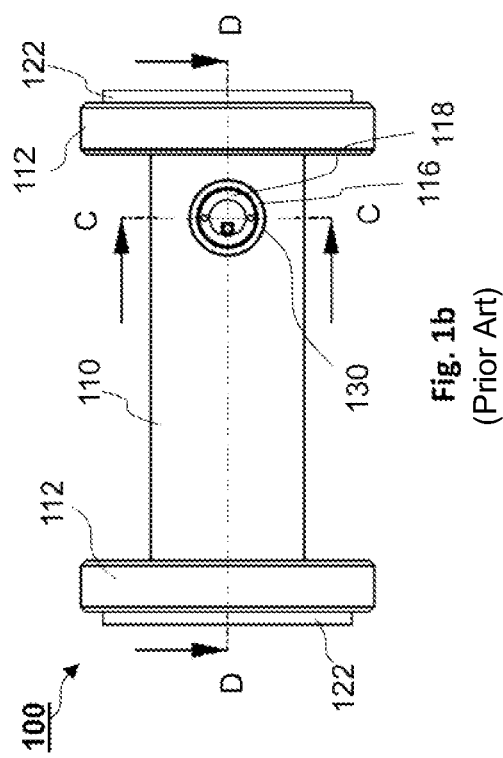
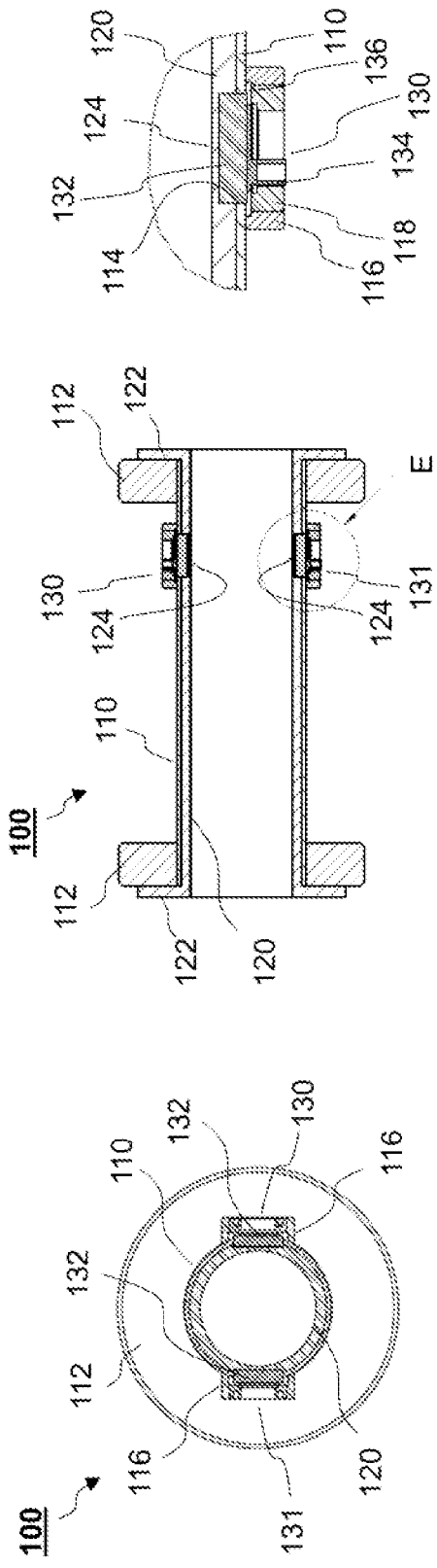
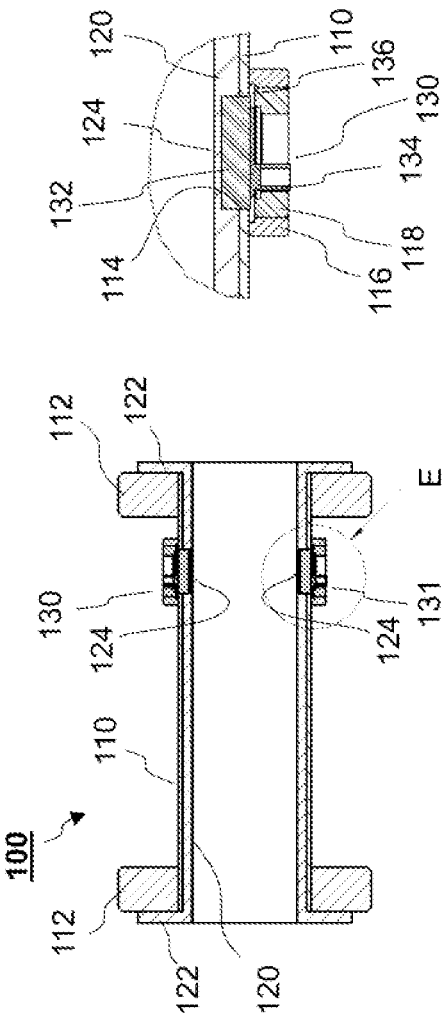

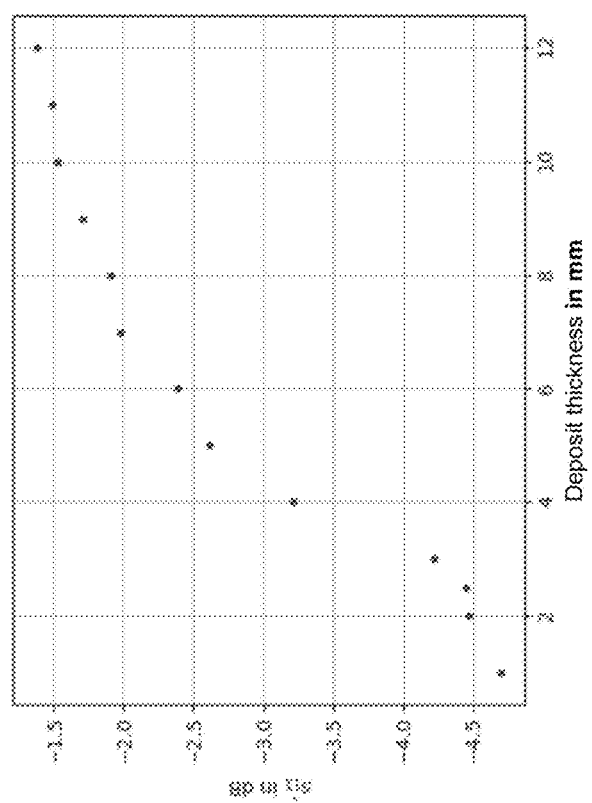
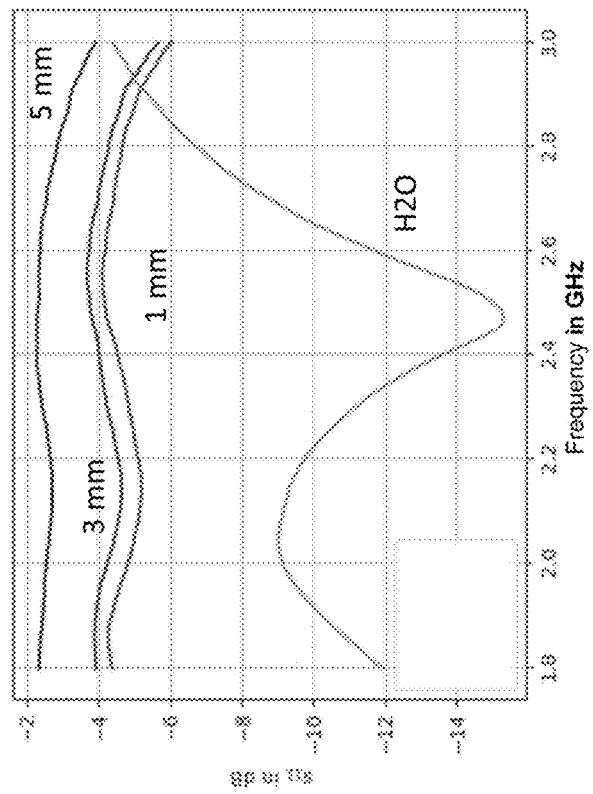
Fig. 7

METHOD FOR DETERMINING A COATING PROPERTY

CROSS-REFERENCE TO RELATED APPLICATIONS

The present application is related to and claims the priority benefit of DPMA Patent Application No. 10 2020 133 858.9, filed on Dec. 16, 2020, and International Patent Application No. PCT/EP2021/083214, filed Nov. 26, 2021, the entire contents of which are incorporated herein by reference.

TECHNICAL FIELD

The invention relates to a method for determining a deposit property of a variable deposit, to a measuring assembly, and to a processing system.

BACKGROUND

It is possible, in particular by means of microwaves, to determine the physical quantities of permittivity and loss factor of a medium in a process pipe. From these two variables—measured either at one or over many different frequencies—it is possible to draw conclusions regarding application-specific parameters, for example the proportion of water in a mixture of water and other non-polar or weakly polar components.

The established transmission/reflection measurement is described in L. F. Chen, C. K. Ong, C. P. Neo, V. V. Varadan, V. K. Varadan—"Microwave Electronics, Measurement and Materials Characterization," John Wiley & Sons Ltd., 2004. For this purpose, the microwave signal interfaces at two different positions at the medium in a container or measuring pipe, the scatter parameters (transmission and optionally reflection) are measured between these interface structures, and the mentioned physical properties of the medium are calculated from the measured scatter parameters.

WO 2018 121927 A1 teaches a measuring assembly for analyzing properties of a flowing medium by means of microwaves. In addition to the microwave antennas, the measuring assembly has an electrically insulating lining layer on the inner peripheral surface of the measuring pipe. This lining layer forms a dielectric waveguide via which at least part of the microwaves can travel from a first microwave antenna to a second microwave antenna. One application for such a measuring assembly is the determination of the proportions of solids in the medium being conveyed. Such applications tackle the formation of deposits—for example, by the solid matter in the medium—on the inner peripheral surface of the measuring pipe and on the microwave antennas.

SUMMARY

The invention is therefore based on the object of providing a method for the detection of a deposit for a microwave assembly, with which the presence of a variable deposit on the end face of the microwave antenna can be detected.

The object is achieved by the method according to the present disclosure.

The method according to the invention for determining a deposit property of a variable deposit on an end face of a first microwave antenna of an assembly for determining a property of an in particular multiphase medium that is to be conveyed, wherein the first microwave antenna is arranged in a first receptacle of the measuring pipe, in particular in a medium-contacting manner, comprises the method steps:

emitting an excitation signal by means of the first microwave antenna, wherein the excitation signal comprises a sequence of high-frequency signals;

receiving a reflected excitation signal by means of the first microwave antenna;

determining a first test quantity on the basis of the reflected excitation signal;

determining on the basis of the first test quantity the deposit property of the variable deposit, in particular a variable dependent on a deposit thickness of the variable deposit.

The measuring assembly according to the invention comprises:

a measuring pipe for conveying a multiphase medium;

a first microwave antenna arranged in a first receptacle of the measuring pipe;

a measuring circuit, wherein the measuring circuit has a high-frequency generator for feeding the first microwave antennas with an excitation signal, in particular with a sequence of high-frequency signals, wherein the measuring circuit is additionally configured to carry out the method according to the invention.

The processing system according to the invention comprises:

the measuring pipe assembly according to the invention, a device for determining a further process property of the medium, in particular a volumetric flow rate, wherein the device for determining the further process property has a measuring circuit for determining a measured variable dependent on the process property, wherein the measuring circuit is configured to determine a corrected process property as a function of the determined measured variable and the deposit property.

Advantageous embodiment of the invention are the subject matter of the dependent claims.

In one embodiment, the first test quantity comprises a first frequency at which an attenuation of the reflected excitation signal assumes an extreme value, in particular a maximum value, wherein, if the first frequency deviates from a frequency target range, the presence of a variable deposit on the end face is deduced.

In one embodiment, the first test quantity comprises a frequency difference between a first frequency and a second frequency, wherein, at the first frequency, an attenuation of the reflected excitation signal assumes a first extreme value, in particular a maximum value, wherein, at the second frequency, the attenuation of the reflected excitation signal assumes a second extreme value, in particular a minimum value, wherein, if the frequency difference deviates from a frequency difference target range, the presence of a variable deposit on the end face is deduced.

In one embodiment, the first test quantity comprises an attenuation difference between a first extreme value, in particular a minimum attenuation value, and a second extreme value, in particular a maximum attenuation value, preferably within a first frequency range.

In one embodiment, the first test quantity comprises a change in a phase difference between the emitted excitation signal and the reflected excitation signal, as a function of the frequency or for a characteristic frequency, wherein, if the change deviates from a change target range, the presence of a variable deposit on the end face is deduced.

In one embodiment, the first test quantity comprises an attenuation value and/or a change in the attenuation value as a function of the frequency in a first frequency range, wherein, if the attenuation value and/or the change in the attenuation value deviates from an attenuation target range, the presence of a variable deposit on the end face is deduced.

The first frequency range preferably covers the frequencies from 0.3 to 20 GHz, in particular 1.8 to 7.5 GHz, and preferably 1.8 to 3.5 GHz.

The change in the attenuation values can be determined via the slope value for a frequency in the first frequency range by averaging the slope values of all frequencies of the first frequency range or by finding a best-fit line over the entire first frequency range.

In one embodiment, the first test quantity comprises a sum, an integral, or a mean value over a first frequency range of the reflected excitation signal.

In one embodiment, the assembly has a second microwave antenna which is arranged in particular diametrically opposite the first microwave antenna, and which is arranged in a second receptacle of the measuring pipe, in particular in a medium-contacting manner, wherein the embodiment comprises the method steps of:

receiving the excitation signal by means of the second microwave antenna determining a second test quantity on the basis of the transmitted excitation signal and/or on the basis of a transform, in particular an integral transform of the transmitted excitation signal, and preferably on the basis of an inverse Fourier transform, wherein the second test quantity is characteristic of the propagation of the excitation signal along a propagation path through an internal volume of the measuring pipe, wherein the propagation path describes an at least partial propagation of the excitation signal at least through the variable deposit on the end face of the first microwave antenna and an inner peripheral surface of the measuring pipe, wherein the second test quantity is included in the determination of the deposit property of the variable deposit, in particular a variable dependent on a deposit thickness of the variable deposit.

The first test quantity provides information about the presence of a deposit on the end face of the first microwave antenna and about the thickness of the deposit, but not about the distribution of the deposit on the inner peripheral surface of the measuring pipe. With the addition of the second test quantity, it is possible to determine whether the deposit covers the inner peripheral surface and thus substantially reduces the flow cross-section.

In one embodiment, the transmitted excitation signal comprises a third frequency at which the attenuation of the transmitted excitation signal assumes a third extreme value, in particular a maximum value, wherein the presence of the variable deposit on the end face is only conclusively deduced if the first test quantity, in particular the attenuation of the reflected excitation signal for a first frequency or an averaged attenuation over a first frequency range, increases, and the first frequency differs from the third frequency, wherein the third frequency corresponds to a measuring pipe resonance.

One embodiment provides the method step of:

determining a corrected pipe cross-section as a function of the first test quantity if the second test quantity deviates from a target value range.

In one embodiment, the measuring assembly comprises a second microwave antenna which is arranged in a second receptacle of the measuring pipe, in particular diametrically opposite the first microwave antenna, wherein the measuring circuit is configured to determine at least one property of the multiphase medium conveyed in the measuring pipe, doing so on the basis of a transmitted excitation signal measured by means of the second microwave antenna.

BRIEF DESCRIPTION OF THE DRAWINGS

The invention is explained in greater detail with reference to the following figures. The following are shown:

FIG. 1a shows a 3D illustration of an embodiment of a measuring assembly according to the prior art;

FIG. 1b shows a side view of the measuring assembly of FIG. 1a;

FIG. 1c shows a cross-section through the measuring assembly of FIG. 1b in the plane C-C;

FIG. 1d shows a cross-section through the measuring assembly of FIG. 1b in the plane D-D;

FIG. 1e shows a detailed view of the measuring assembly of FIG. 1d at the position marked E;

FIG. 7 shows a reflected excitation signal over a frequency range of 1.8 to 3.0 GHz and an average value of the reflected excitation signal as a function of the deposit thickness;

DETAILED DESCRIPTION

Figure 2:
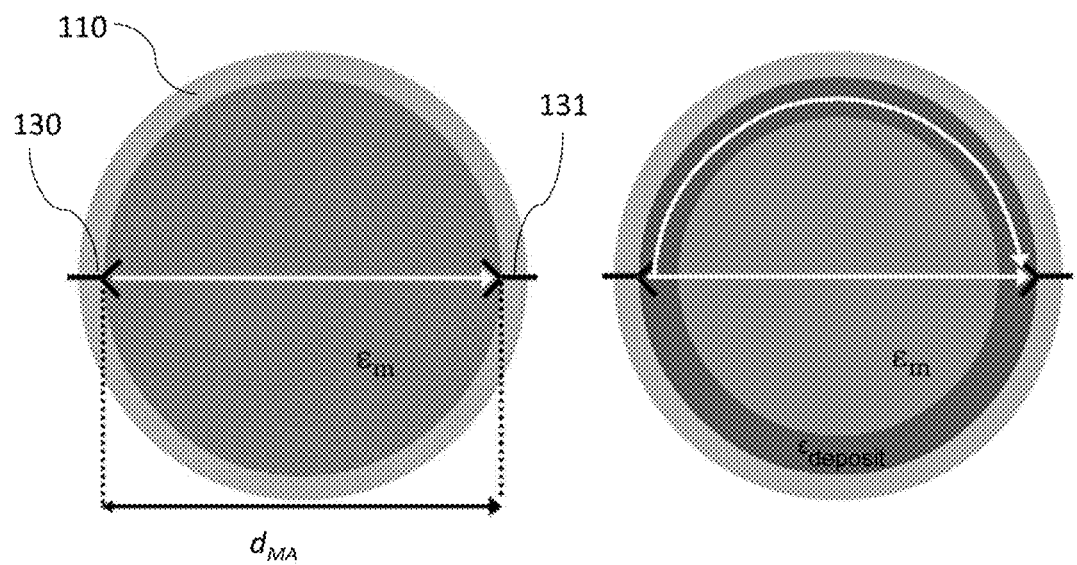
FIG. 2 shows illustration examples of the wave propagation of the transmitted excitation signal in a measuring pipe with and without a variable deposit.

The measuring assembly 100 shown in FIGS. 1a to 1e comprises a partially cylindrical measuring pipe 110 with metallic connection flanges 112 at the ends, lined with a liner 120 which is not essential to the invention and which comprises a plastic, for example a polyurethane or a fluoropolymer such as PFA or PTFE. The liner 120 may have end-face sealing surfaces 122 which lead out of the measuring pipe 110 and abut the end faces of the flanges 112. In order to be able to input and output microwaves, the measuring assembly 100 comprises two microwave antennas 130, 131 arranged opposite one another on a peripheral surface of the measuring pipe 110, the details of which are shown in particular in FIG. 1e. Near each of the microwave antennas 130, 131, the measuring pipe 110 has an aperture 114 which is surrounded on the outer peripheral surface of the measuring pipe 100 by a threaded sleeve 116, into which a clamping ring 118 is screwed in order to clamp against the liner 120 a ceramic plate 132 which forms a support body for a planar antenna, as well as a terminal board 134 which is arranged on the outside of the ceramic plate 132. In order to compensate for temperature fluctuations and manufacturing tolerances, an elastic ring 136 can additionally be arranged between the clamping ring 118 and the ceramic plate 132 and/or the terminal board 134. At the position of the ceramic plate 132, the liner 120 has a recess 124 which is completely filled by the ceramic plate 132. As a result, a support body of a planar antenna is introduced into the liner 120, without affecting the integrity of the liner 120 toward the interior of the measuring tube. In addition, the compressive strength of the measuring assembly is maintained by suitable dimensioning of the ceramic plate 132 and the clamping ring 118. For the measuring assembly 100 illustrated, it would be advantageous if the liner 120 were additionally delimited in the longitudinal direction of the measuring pipe 110 by electrically conductive material, in particular metal. An example of this would be a metallic pipe of a pipeline connected via the process connections 112. Furthermore, the measuring assembly 100 comprises a measuring circuit 260 which is connected to the microwave antennas 130, 131. The measuring circuit 260 has a high-frequency generator for feeding the first microwave antennas 130 with an excitation signal, in particular with a sequence of high-frequency signals, and is configured to determine at least one process property of a medium conveyed in the measuring pipe 110 on the basis of an excitation signal received from the second microwave antenna 131, wherein the process property corresponds to a solids content in the medium. Furthermore, the measuring circuit 260 is also configured to carry out the method according to the invention.

FIG. 2 shows an illustration example of the wave propagation of the transmitted excitation signal for a measuring pipe without a variable deposit (left) and with a variable deposit (right). The cross-section shows a first microwave antenna 130 and a second microwave antenna 131, which are arranged diametrically opposite each other on a measuring pipe 110, and are spaced apart over a shortest distance $d_{MA}$. The first microwave antenna 130 is configured to generate the excitation signal and to direct it into the medium being conveyed. The second microwave antenna 131 is configured to detect the transmitted excitation signal. Both microwave antennas 130, 131 are suitable for generating and detecting excitation signals. In the case, the measuring pipe 110 comprises a metallic support pipe without an electrically insulating lining on the inner peripheral surface. When there is no variable deposit in the measuring assembly 100, the excitation signal propagates substantially through the medium with the dielectric constant $\varepsilon_m$. For the sake of simplicity, the propagation of the excitation signal along the support pipe is omitted. The white arrow indicates the shortest path for the excitation signal. A lower limit of the travel time of the excitation signal through the medium is given by $$\tau_M = d_{MA} \cdot \frac{\sqrt{\varepsilon_m}}{c_0} \sim 2.4 \text{ ns},$$

where $c_0$ is the speed of light in a vacuum, and the value for water is assumed for the dielectric constant $\varepsilon_M$. A continuous deposit with a dielectric constant of $\varepsilon_{deposit}$ forms on the inner surface of the measuring pipe, connecting the two microwave antennas 130, 131 to one another and even covering the end faces of each. This means that a further path along which the excitation signal is preferably propagated (see curved arrow) is formed. The delay time for the further path can be determined as $$\tau_M = \frac{\pi}{2} \cdot d_{MA} \cdot \frac{\sqrt{\varepsilon_m}}{c_0} \sim 0.7 \text{ ns},$$

wherein a typical value for saturated carbon is assumed as the value for the dielectric constant $\varepsilon_{deposit}$. The travel time of the excitation signal along the further path thus lies significantly below the lower limit for the travel time of the excitation signal through the medium. The method according to the invention for determining the presence of a deposit property of a variable deposit takes advantage of this, and deduces the presence of a deposit and its deposit properties from the determined propagation times of the transmitted signal.

Figure 3:
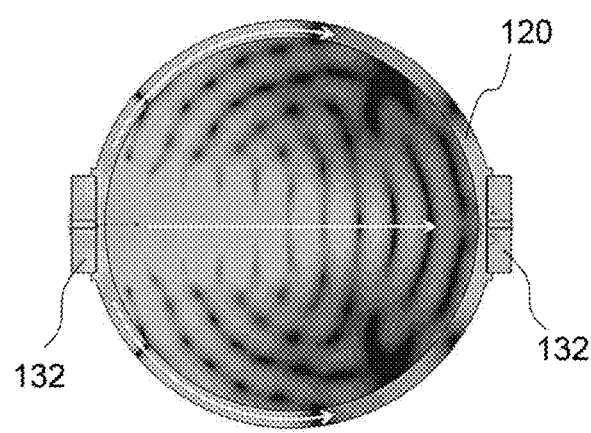
FIG. 3 shows an example of simulation results for the field distribution of a wave propagation in a measuring assembly according to the invention with a continuously variable deposit.

Each of these modes, which propagate predominantly in the variable deposit, leads to an associated current density distribution in the conductive interfaces. However, such a current density distribution in the medium-contacting boundary layer of the liner also causes the propagation of an electromagnetic field into the non-ideally conductive medium. The boundary layer thus fulfills the function of an antenna. The faster propagation speed in the variable deposit in comparison to typical aqueous media leads to a directed emission of electromagnetic power through the medium, as illustrated in FIG. 3. The intensities of gray in this case correspond to the electric field strength.

Figure 4:
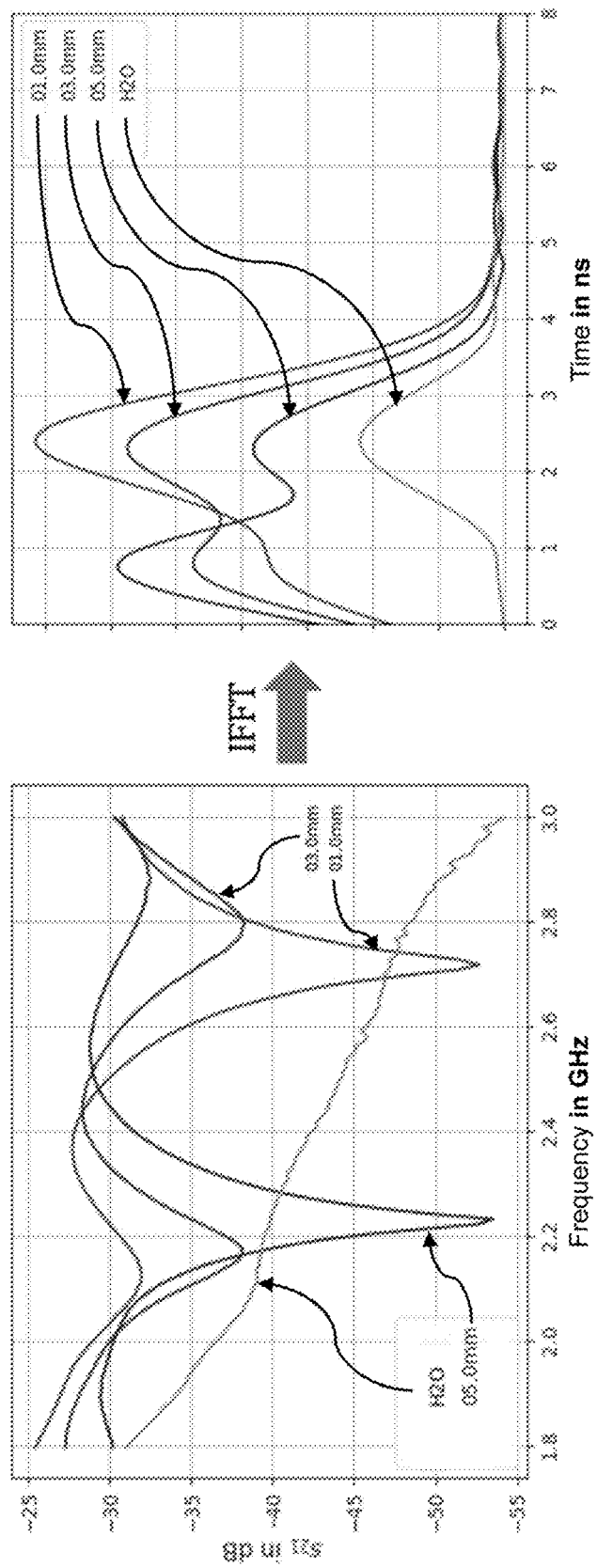
FIG. 4 shows a transmitted excitation signal over a frequency range of 1.8 to 3.0 GHz and the inverse fast Fourier transform of the transmitted excitation signal.

FIG. 4 shows by way of example transmitted excitation signals hitting water, as the medium being conveyed, wherein the excitation signal is a plurality of signals with different frequencies. Disregarding noise or measurement inaccuracy, the measured excitation signal of the reference measurement H2O, in which no deposit is present, decreases continuously over the entire frequency range, i.e., the attenuation of the excitation signal increases with increasing frequency. If a continuous deposit is present on the inner peripheral surface of the measuring pipe, in each case two minima will occur in the excitation signal irrespective of the thickness of the deposit—1, 3, or 5 mm—which differ in their attenuation values. With increasing deposit thickness, the frequencies of the minima also migrate to higher frequencies. An inverse Fourier transform—in this case an inverse fast Fourier transform (IFFT)—transforms the excitation signal from the frequency range into a time range. For the reference measurement in the time range from 0 to 4 ns, the transformed excitation signal has only one maximum at a delay of about 2.4 ns, which also corresponds to the expected travel time of the excitation signal through water. When a deposit is present, a further maximum is formed at lower delays (about 0.7 ns). In the case of a deposit with a deposit thickness of 1 mm, this maximum is only visible as a shoulder, but, with increasing deposit thickness, it increases such that the amplitude value for, for example, a deposit thickness of 5 mm is already higher than the water's contribution to the excitation signal. The reason for the second maximum is the further path that forms due to the deposit, along which the excitation signal propagates with a shorter travel time. The amplitude value for the travel time along the shortest distance increases once a deposit is present. This is due to the improved coupling of the excitation signal into the water through the deposit on the end face of the microwave antenna.

Figure 5:
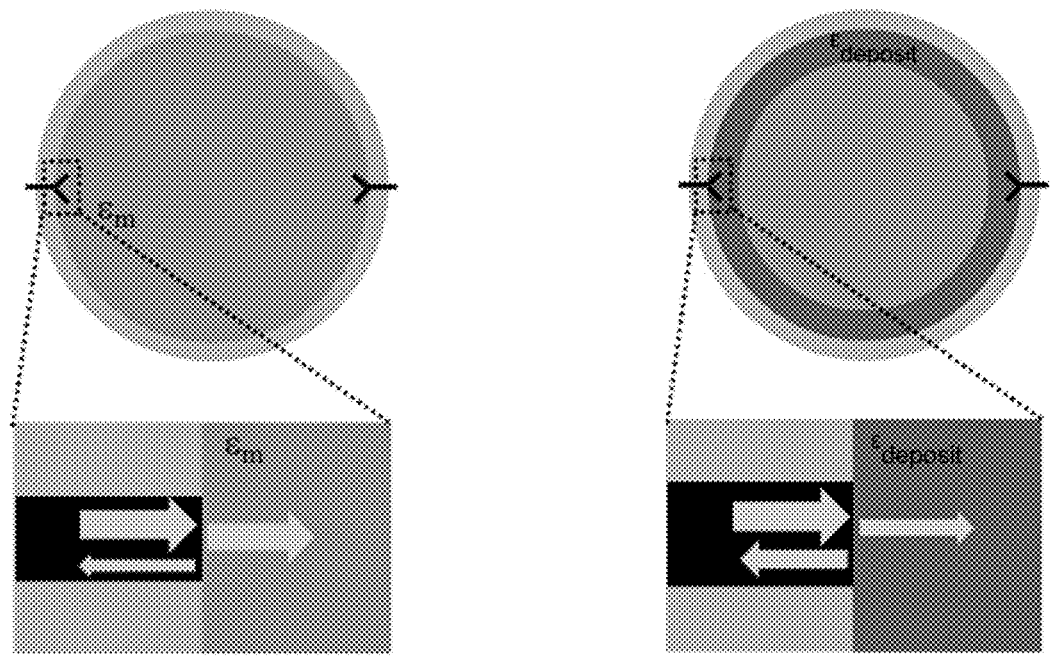
FIG. 5 shows illustration examples of the wave propagation of the reflected signal in a measuring pipe with and without a variable deposit.

FIG. 5 shows an illustration example of the wave propagation of the reflected excitation signal in a measuring pipe without a variable deposit (left) and with a variable deposit (right). In addition, FIG. 5 shows a close-up view for the two cases mentioned. In the deposit-free case, the generated excitation signal (broad first arrow in the direction of the medium) is at least partially reflected at the interface with the medium with the dielectric constant $\varepsilon_m$ (narrow second arrow in opposite direction to the first arrow). However, a large part of the excitation signal is directed into the medium (third arrow in the medium). If a deposit with a dielectric constant $\varepsilon_{deposit} < \varepsilon_m$ is present on the end face of the microwave antenna, a larger portion of the excitation signal will be reflected at the interface with the deposit and detected by the measurement at the microwave antenna. This has a significant influence on the measurement signal of the microwave antenna detecting the reflected excitation signal. The measurement signal, in particular the attenuation value of the measurement signal, increases with increasing deposit thickness.

Figure 6:
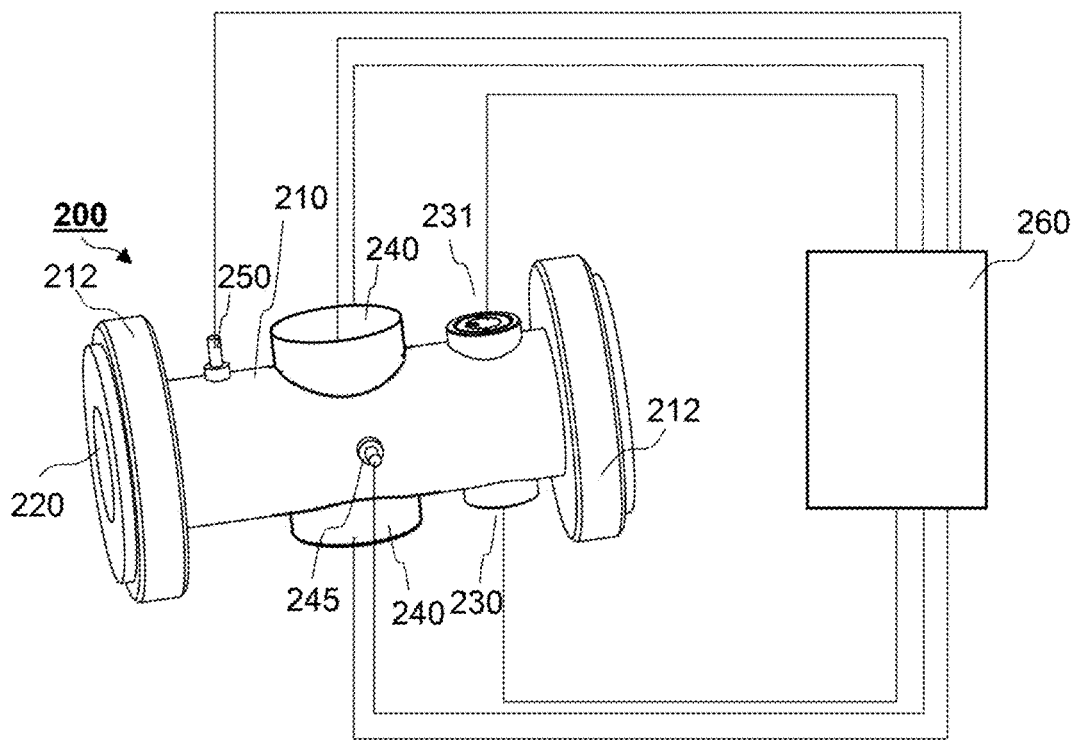
FIG. 6 shows a perspective view of a further embodiment of the measuring assembly according to the invention.

Finally, FIG. 6 shows a further embodiment of a measuring assembly 200, which essentially corresponds to the measuring assembly of FIGS. 1a to 1e. In addition to two microwave antennas 230, 231 for the microwave signals, two field coil assemblies 240 for magnetically inductive flow measurement (MIFM) are arranged on a measuring pipe 210 in the same orientation. In the axial position of the field coil assemblies 240, two opposite electrodes 245 are arranged perpendicular to the direction of a magnetic field acting between field coil assemblies 240 and perpendicular to the axial direction of the measuring pipe, which extend through the measuring pipe 210 and a liner 220 into the interior of the measuring pipe 210 in order to detect a flow-dependent potential of a flowing medium. (In the drawing, only one electrode is shown.) In addition, the measuring assembly 200 comprises a temperature sensor 250 for detecting a temperature of the medium. The measuring assembly 200 further comprises a measuring circuit 260 to which the microwave antennas 230, 231, the field coil assemblies 240, the electrodes 245, and the temperature sensor 250 are connected. The measuring circuit 260 can have various subunits which separately process different measuring tasks of the measuring assembly 200. Furthermore, the measuring circuit 260 comprises a high-frequency generator which is configured to feed at least one of the microwave antennas 230, 231 a sequence of high-frequency signals of different frequencies. Instead of the separate microwave antennas 230, 231, hollow conductor antennas with an integrated MIFM electrode at the position of the electrodes 245 can also be used in a modification.

FIG. 7 shows a reflected excitation signal over a frequency range of 1.8 to 3.0 GHz (left-hand graph), and an averaging of the respective reflected excitation signal as a function of the deposit thickness (right-hand graph). The reflected excitation signal if there is no deposit has two pronounced extremes. In the frequency range from 1.8 to about 2.9 GHz, the excitation signal strength is lower than when a deposit is present. With increasing deposit thickness, the excitation signal strength also increases in the frequency range from 1.8 to about 2.9 GHz. A distribution of the signal strength over a frequency sub-range indicates a deposit thickness relationship. On the basis of the distribution—e.g., averaging, summation or integration over the frequency sub-range—it is possible to find a relationship with a deposit thickness.

Figure 8:
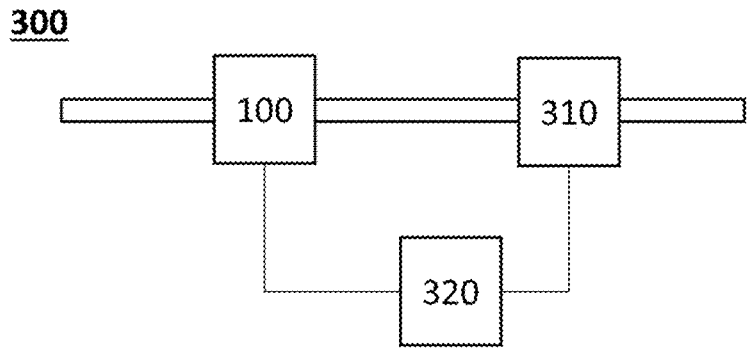
FIG. 8 shows a schematic diagram of a processing system with a measuring assembly according to the invention.

FIG. 8 schematically shows a process system 300 comprising a measuring assembly 100 according to the invention and a device 310 for determining a further process property of the medium, in particular a volumetric flow rate, and which has a measuring circuit 320 for determining a measured variable dependent on the process property. This measuring circuit 320 is configured to determine a corrected process property as a function of the determined measured variable and the deposit property determined by means of the measuring assembly 100. The further process property can be, for example, a calculated volumetric flow rate which, when the flow cross-sectional area is changed, deviates from the actually present volumetric flow rate due to a deposit on the inner peripheral surface of the measuring pipe.

Figure 9:
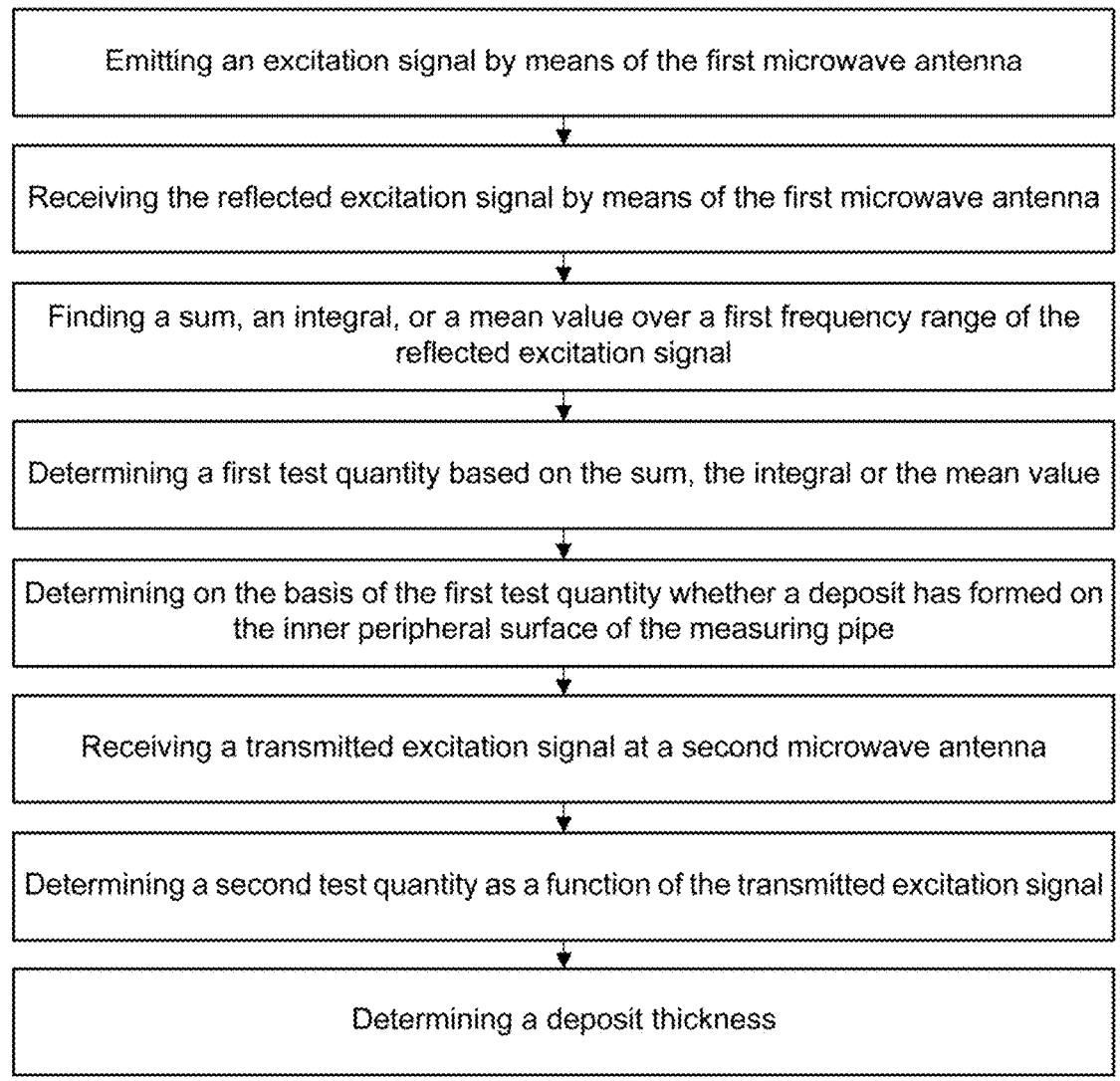
FIG. 9 shows a method chain according to the invention of the method for determining a deposit property of a variable deposit.

FIG. 9 shows a method chain of the method according to the invention for determining a deposit property of a variable deposit, comprising the method steps of:

Emitting an excitation signal by means of the first microwave antenna which is arranged in a receptacle in the measuring pipe. The excitation signal is a sequence of high-frequency signals which are produced with a high-frequency generator.

Receiving a reflected excitation signal by means of the first microwave antenna, which is designed such that it cannot only generate signals but also can receive signals. The excitation signal can, for example, be an attenuation value at one frequency or a sequence of attenuation values of different frequencies.

Determining a first test quantity using the reflected excitation signal. An advantageous possibility for determining the first test quantity is the formation of a sum, an integral or a mean value over a first frequency range of the reflected excitation signal.

Alternatively, the first test quantity can comprise—or, in particular, can be—a first frequency at which an attenuation of the reflected excitation signal assumes an extreme value, in particular a maximum value, wherein the presence of a variable deposit on the end face is deduced if the first frequency deviates from a frequency target range.

Alternatively, the first test quantity can comprise and/or be a frequency difference between a first frequency and a second frequency, wherein at the first frequency an attenuation of the reflected excitation signal assumes a first extreme value, in particular a maximum value, wherein at the second frequency the attenuation of the reflected excitation signal assumes a second extreme value, in particular a minimum value, wherein the presence of a variable deposit on the end face is deduced if the frequency difference deviates from a frequency difference target range.

Alternatively, the first test quantity can be an attenuation difference between a first extreme value, in particular a minimum attenuation value, and a second extreme value, in particular a maximum attenuation value, preferably within a first frequency range.

Alternatively, the first test quantity can be a change in a phase difference between the emitted excitation signal and the reflected excitation signal as a function of the frequency or for a characteristic frequency, wherein the presence of a variable deposit on the end face is deduced if the change deviates from a change target range.

Alternatively, the first test quantity can be an attenuation value and/or a change in the attenuation value as a function of the frequency in a first frequency range. If the attenuation value and/or the change in the attenuation value deviates from an attenuation target range, the presence of a variable deposit on the end face is deduced.

Alternatively, a target travel time can be determined on the basis of the second test quantity, the amplitude value of which forms the first test quantity. If the amplitude value deviates from a target range, the presence of a variable deposit on the end face is deduced.

Determining on the basis of the first test quantity the deposit property of the variable deposit, in particular a variable dependent on a deposit thickness of the variable deposit.

Receiving the excitation signal by means of the second microwave antenna.

Determining a second test quantity on the basis of the transmitted excitation signal and/or on the basis of a transform, in particular an integral transform of the transmitted excitation signal, and preferably on the basis of an inverse Fourier transform, wherein the second test quantity is characteristic of the propagation of the excitation signal along a propagation path through an internal volume of the measuring pipe, wherein the propagation path describes an at least partial propagation of the excitation signal at least through the variable deposit on the end face of the first microwave antenna and an inner peripheral surface of the measuring pipe, wherein the second test quantity is included in the determination of the deposit property—in particular, a variable dependent on a deposit thickness of the variable deposit—of the variable deposit.

Determining a deposit thickness at least as a function of the first test quantity.

Further method steps:

Determining a corrected pipe cross-section as a function of the first test quantity if values of the second test quantity deviate from a target value range.

Outputting a warning if the values of the first test quantity and/or of the second test quantity deviate from a target value range.

Determining a remaining duration until the next cleaning.

The invention claimed is:

1. A method for determining a deposit property of a variable deposit on an end face of a first microwave antenna of an assembly for determining a property of a multiphase medium that is to be conveyed, wherein the first microwave antenna is arranged in a first receptacle of a measuring pipe of the assembly in a medium-contacting manner, the method comprising:
   emitting an excitation signal via the first microwave antenna, wherein the excitation signal includes a sequence of high-frequency signals;
   receiving, via the first microwave antenna, a reflected excitation signal that is reflected from an interface of the first microwave antenna with the multiphase medium or with the variable deposit;
   determining a first test quantity on the basis of the reflected excitation signal, wherein the first test quantity is a sum, an integral, or a mean value over a first frequency range of the reflected excitation signal; and
   determining on the basis of the first test quantity the deposit property of the variable deposit, wherein the deposit property is a variable dependent on a deposit thickness of the variable deposit.

2. The method according to claim 1,
wherein the assembly further includes a second microwave antenna arranged in a second receptacle of the measuring pipe diametrically opposite the first microwave antenna and in a medium-contacting manner, the method further comprising:
   receiving the excitation signal via the second microwave antenna; and
   determining a second test quantity on the basis of the transmitted excitation signal and/or on the basis of an integral transform of the transmitted excitation signal,
wherein the second test quantity is characteristic of a propagation of the excitation signal along a propagation path through an internal volume of the measuring pipe,
wherein the propagation path describes an at least partial propagation of the excitation signal at least through the variable deposit on the end face of the first microwave antenna and an inner peripheral surface of the measuring pipe, and
wherein the second test quantity is included in the determination of the deposit property of the variable deposit.

3. The method according to claim 2,
wherein the transmitted excitation signal includes a third frequency at which the attenuation of the transmitted excitation signal assumes a third extreme value,
wherein a presence of the variable deposit on the end face of the first microwave antenna is only unequivocally deduced if the attenuation of the reflected excitation signal for a first frequency or an averaged attenuation over a first frequency range, increases and the first frequency differs from the third frequency, and
wherein the third frequency corresponds to a measuring pipe resonance.

4. The method according to claim 3, further comprising:
determining a corrected pipe cross-section as a function of the first test quantity when the second test quantity deviates from a target value range.

5. The method according to claim 1,
wherein the first frequency range has frequencies of 0.3 to 20 GHz.

6. A measuring assembly, comprising:
a measuring pipe for conveying a multiphase medium;
a first microwave antenna arranged in a first receptacle of the measuring pipe;
a measuring circuit including a high-frequency generator for feeding the first microwave antenna with an excitation signal,
wherein the measuring circuit is additionally configured to:
   emit the excitation signal via the first microwave antenna, wherein the excitation signal includes a sequence of high-frequency signals;
   receive, via the first microwave antenna, a reflected excitation signal that is reflected from an interface of the first microwave antenna with a multiphase medium or with a variable deposit on an end face of a first microwave antenna;
   determine a first test quantity on the basis of the reflected excitation signal, wherein the first test quantity is a sum, an integral, or a mean value over a first frequency range of the reflected excitation signal; and
   determine on the basis of the first test quantity a deposit property of the variable deposit, wherein the deposit property is a variable dependent on a deposit thickness of the variable deposit.

7. The measuring assembly of claim 6, further comprising:
   a second microwave antenna arranged in a second receptacle of the measuring pipe diametrically opposite the first microwave antenna,
   wherein the measuring circuit is further configured to determine at least one property of the multiphase medium conveyed in the measuring pipe on the basis of a transmitted excitation signal measured via the second microwave antenna.

8. A processing system, comprising:
   a measuring assembly, including:
      a measuring pipe for conveying a multiphase medium;
      a first microwave antenna arranged in a first receptacle of the measuring pipe;
      a measuring circuit including a high-frequency generator for feeding the first microwave antenna with an excitation signal,
      wherein the measuring circuit is additionally configured to:
         emit the excitation signal via the first microwave antenna, wherein the excitation signal includes a sequence of high-frequency signals;
         receive via the first microwave antenna, a reflected excitation signal that is reflected from an interface of the first microwave antenna with the multiphase medium or with a variable deposit on an end face of a first microwave antenna;
         determine a first test quantity on the basis of the reflected excitation signal, wherein the first test quantity is a sum, an integral, or a mean value over a first frequency range of the reflected excitation signal; and
         determine on the basis of the first test quantity a deposit property of the variable deposit, wherein the deposit property is a variable dependent on a deposit thickness of the variable deposit; and
   a device for determining a further process property of the medium,
   wherein the device for determining the further process property includes a measuring circuit for determining a measured variable dependent on the further process property, and
   wherein the measuring circuit of the device for determining the further process property of the medium is configured to determine a corrected process property as a function of the determined measured variable and the deposit property.

* * * * *